United States Patent Office 3,244,492
Patented Apr. 5, 1966

3,244,492
FUELS CONTAINING CYCLOMATIC NICKEL COMPOUNDS HAVING ONE NICKEL ATOM
Michael Dubeck, Royal Oak, Mich., assignor to Ethyl Corporation, New York, N.Y., a corporation of Virginia
No Drawing. Original application Sept. 12, 1960, Ser. No. 55,179, now Patent No. 3,097,225, dated July 9, 1963. Divided and this application Nov. 9, 1962, Ser. No. 236,704
15 Claims. (Cl. 44—69)

This invention relates to novel organometallic compounds and their mode of preparation. More specifically, this invention relates to bis(cyclomatic) nickel acetylene compounds. These compounds are formed by reaction between a bis(cyclomatic) nickel compound, e.g., nickelocene, and an acetylene compound.

This application is a continuation in part of my prior application 30,075, filed May 19, 1960, now abandoned, and is a division of application Serial No. 55,179, now U.S. 3,097,225. In that application, the presently claimed compounds were disclosed but in some cases were incorrectly named due to an error in the determination of their structure. The present application is filed to correct the errors in the prior application by giving the correct structure for the compounds.

As a result of my compounds' increased stability as compared with their bis(cyclomatic) nickel precursor compounds, they are eminently suitable for use in automotive, agricultural and pharmaceutical applications where stable nickel-containing organo-metallic compounds are desired. My compounds are also eminently useful as synthesis intermediates since the functional groups attached to the acetylenic group in the molecule may contain reactive centers on which further chemical reactions can take place. As a result, my compounds can be utilized in forming polymers through reactions conducted on the reactive substituent groups attached to the aceylencic group present in the molecule.

It is an object of this invention to provide a novel class of bis(cyclomatic) nickel acetylene compounds. A further object is to provide a process for the preparation of these compounds. An object is also to provide the dihydro derivatives of my compounds having the formula QC≡CQ'—CyNiCy' as described later. Another object is to provide both fuels and antiknock fluids containing a bis(cyclomatic) nickel acetylene compound or a dihydro derivative thereof as either a primary antiknock or as a supplemental antiknock in addition to the primary antiknock material. Additional objects of this invention will become apparent from a reading of the specification and claims which follow.

The objects of this invention are accomplished by providing compounds represented by the formula:

$$QC \equiv CQ' \cdot CyNiCy'$$

Cy and Cy' represent cyclomatic hydrocarbon groups. Q and Q' may be the same or different and are either electron withdrawing groups or any monovalent group which does not react with nickel and is not an electron withdrawing group. Typical of such monovalent groups are the lower alkyls such as ethyl, methyl, amyl and octyl; an aryl group such as tolyl, benzyl and the like, or hydrogen. In the case where either Q or Q' is not an electron withdrawing group, the other of the Q groups is an electron withdrawing group. The applicable Q groups will be defined in some detail later in the specification. By virtue of the electrons donated to the nickel atom, it achieves the inert gas electron configuration of krypton.

The cyclomatic hydrocarbon groups, designated by the symbols Cy and Cy' in the above formula, may be the same or different and are cyclopentadienyl-type hydrocarbon groups. By this, it is meant that the radical contains the cyclopentadienyl moiety. In general, such cyclomatic hydrocarbon groups can be represented by the formulae:

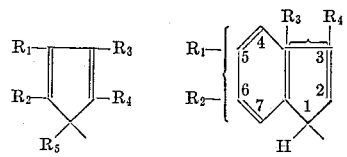

wherein the R's are selected from the group consisting of hydrogen and univalent hydrocarbon radicals.

At least one of the substituent groups, Q or Q', as shown in the above formula, is an electron withdrawing group. The other substituent group can also be an electron withdrawing group or can be a monovalent substituent group which is unreactive with nickel and further is not an electron withdrawing group. Typical of the electron withdrawing groups Q and/or Q' are the following:

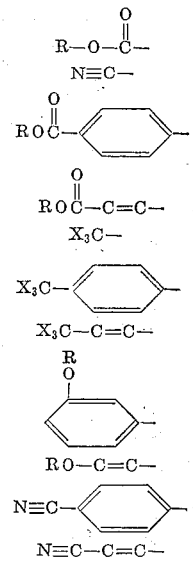

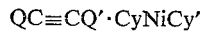

In the above electron withdrawing groups, which are typical of Q and Q', R can be any group which does not react with the nickel reactant. Typically, R is a monovalent hydrocarbon group which may be an alkyl, aryl, aralkyl, alkaryl, alkenyl, cycloalkyl, cycloalkenyl and the like. Typical of such groups are methyl, tert-butyl, cyclohexyl, propenyl, benzyl, p-methylphenyl and the like. Preferably, R does not contain more than 10 carbon atoms. "X" denotes a halogen group such as fluoro, chloro, bromo or iodo. When X is attached to a carbon atom which is in the alpha position relative to the triple bond of the bridging acetylenic compound, X is preferably fluorine. Since the fluorine atom is smaller than the other halogen atoms, it does not tend to sterically interfere with the reactivity of the acetylenic triple bond to the extent that larger halogen atoms do.

As indicated previously, when one of the Q substituent groups is an electron withdrawing group, the other Q substituent may be a monovalent group such as hydrogen or a monovalent organic group such as alkyl, aryl, aralkyl, alkaryl, alkenyl, cycloalkyl, cycloalkenyl and the like which does not react with the nickel reactant and is not an electron withdrawing group. The Q groups may also contain non-hydrocarbon atoms such as in the case of a mercuro halide, a silyl, phosphine, arsine or stibine group. Typical of such substituent groups which are not electron withdrawing groups are the lower alkyls, e.g. methyl, ethyl, butyl, amyl and octyl; the aryls such as phenyl, anthracyl and the like; aralkyl groups such as benzyl, phenylbutyl, phenylheptyl and the like; alkaryl groups such as p-ethylphenyl, amylphenyl and heptylphenyl; alkenyl groups such as 3-buten-1-yl, 1-tridecen-13-yl, 2,4-butadien-1-yl and the like; cycloalkyl groups such as cyclohexyl, 4-methylcyclopentyl and cyclooctyl, and cycloalkenyl groups such as cyclopentadienyl, cyclohexenyl and the like. Preferable, the monovalent groups is a hydrocarbon group and contains no more than 13 carbon atoms.

A preferred class of cyclomatic groups suitable in the practice of my invention are those which contain from five to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4-tert-butyl indenyl and the like. The compounds which yield these groups are preferred as they are the more readily available cyclomatic compounds, and the compounds of my invention containing these groups have the more desirable physical characteristics which render them of superior utility.

Although not bound by any theory, my compounds QC≡CQ'·CyNiCy' are believed to have the following structure as illustrated for the compound dicyclopentadienyl nickeldimethyl butyndioate:

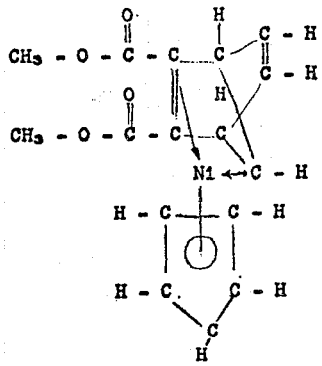

The cyclopentadienyl ring is depicted as donating five electrons and the 2,3-bis(methoxycarbonyl)-2,5-norbornadien-7-yl ring is depicted as donating three electrons to the nickel atom in its zero oxidation state. This gives a total of eight donated electrons and results in the nickel atom having the electron configuration of krypton which is the next higher inert gas above nickel in the periodic table.

The above structure has been confirmed by an exhaustive study of the chemical and physical properties of the compound. The compound is diamagnetic and therefore contains no unpaired electrons. This confirms the fact that the nickel atom in the molecule has the electronic configuration of krypton. As shown in Example I, its elemental analysis and molecular weight are in accord with the theoretical values.

Reduction of dicyclopentadienyl nickel-dimethylbutynedioate in ethanol solution by treating it with hydrogen in the presence of reduced platinum oxide catalyst yielded cyclopentane, metallic nickel, and dimethyl endo-cis-2,3-norbornanedicarboxylate. The latter compound was obtained as colorless needle-like plates having a melting point of 55° C. and an elemental analysis of 62.3 percent carbon and 7.55 percent hydrogen. The calculated analysis for dimethyl endo-cis-2,3-norbornanedicarboxylate ($C_{11}H_{14}O_4$) was: C, 62.25, and H, 7.60 percent.

The compound dimethyl endo-cis-2,3-norbornanedicarboxylate was synthesized by an independent route which involved reacting dimethyl butynedioate in ethanolic solution with cyclopentadiene monomer. The product obtained was dissolved in ethanol and reduced with hydrogen in the presence of reduced platinum oxide as a catalyst. There was obtained, in 82 percent yield, the compound dimethyl endo-cis-2,3-norbornanedicarboxylate as colorless crystals having a melting point of 55° C. A comparison of the synthesized compound with the compound obtained by degradation of dicyclopentadienyl nickel-dimethyl butynedioate showed them to be identical. Their infrared spectra were superimposable and their melting points, both separate and mixed were identical.

Further corroboration of structure was obtained by an examination of the ultra violet and nuclear magnetic resonance spectra of dicyclopentadienyl nickel-dimethyl butyndioate. The spectra corresponded to the values called for by the above structure.

Still further evidence as to structure was obtained by carefully hydrogenating dicyclopentadienyl nickel-dimethyl butyndioate. One equivalent, or one mole of hydrogen per mole of dicyclopentadienyl nickel-dimethyl butyndioate, was taken up to form a compound having the structure:

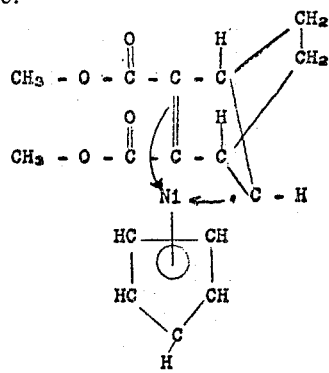

As shown, the double bond between the 5 and 6 carbon atoms in the 2,3-bis(methoxycarbonyl)-2,5-norbornadien-7-yl radical was reduced to form the 2,3-bis(methoxycarbonyl)-2-norbornene-7-yl radical. The reduced compound, the dihydro derivative of dicyclopentadienyl nickel-dimethyl butyndioate, was obtained as red needle-like crystals having a melting point of 58° C. On analysis, there was found: C, 57.5; H, 5.51 percent with a molecular weight of 332. Calculated for $C_{16}H_{18}O_4Ni$: C, 57.7; H, 5.44 percent with a molecular weight of 333. The infrared, ultraviolet, and nuclear magnetic resonance spectra of the dihydro derivative of dicyclopentadienyl nickel-dimethyl butyndioate were obtained and compared with the corresponding spectra of dicyclopentadienyl nickel-dimethyl butyndioate. This comparison showed only the expected differences caused by reduction of the double bond in the parent compound.

On the basis of the above structural studies, it appears that the reaction taking place in my process is a Diels-Alder addition of the acetylenic reactant QC≡CQ' across one of the cyclomatic groups Cy or Cy' of the bis(cyclomatic) nickel reactant. A more generalized structural formula for my compounds is, therefore:

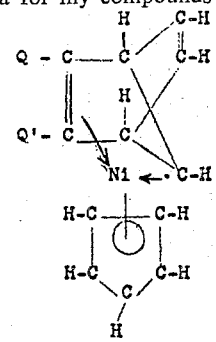

in which Q and Q' have the meaning as previously defined. In the above formula, the hydrogen atoms can be replaced by R groups denoting univalent hydrocarbon radicals as previously defined in the description of the cyclomatic radicals Cy and Cy'. Also, the above structure can be appropriately modified in the case where the cyclomatic radicals Cy and Cy' are fused ring structures such as indenyl radicals.

The dihydro derivatives of my compounds $$QC \equiv CQ' \cdot CyNiCy'$$

have the more generalized structural formula:

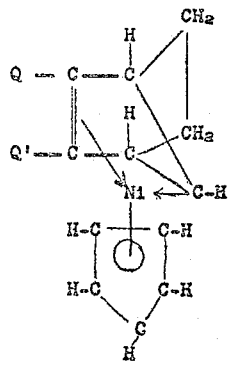

in which Q and Q' have the meaning as previously defined. As in the case of the preceding formula for my compounds $QC \equiv CQ' \cdot CyNiCy'$, the hydrogens can be replaced by R groups and the formula can be appropriately modified when the cyclomatic radicals Cy and Cy' are indenyl radicals.

The method by which my compounds are formed involves the following chemical reaction:

$$Q-C \equiv C-Q' + CyNiCy' \rightarrow QC \equiv CQ' \cdot CyNiCy'$$

This reaction may, in general, be carried out between about −30° C. and about 110° C. Preferably, however, the reaction is carried out between about zero to about 70° C. since within this range yields are maximized and undesirable side reactions are minimized. A second product which is formed in my process is a bis(cyclopenta-dienyl nickel) acetylene compound having the formula:

$$QC \equiv CQ' \cdot CyNi-NiCy'$$

This second product is believed to have the general structural formula:

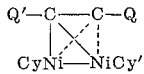

In the above formulae, the substituent groups, Q and Q', have the meaning previously set forth. The groups designated by Cy and Cy' are cyclopentadienyl-containing radicals containing from five to about 13 carbon atoms as previously defined. These compounds are fully described in my co-pending application, Serial No. 852,216, filed November 12, 1959, now U.S. 3,097,224.

In general, pressures between about atmospheric and about 10,000 p.s.i.g. may be employed. A preferred pressure range is between about atmospheric pressure, which is preferred, to about 250 p.s.i.g. since within this range high yields are obtainable without the expense and safety precautions necessitated by the use of higher pressure.

The reaction is generally carried out in the presence of a solvent although in certain cases the acetylenic reactant, if used in excess, may serve as the solvent. In general, any unreactive solvent in which the bis(cyclomatic) nickel compound is fairly soluble may be employed. Typical of such solvents are high boiling saturated hydrocarbons having up to about 20 carobn atoms such as eicosane, pentadecane and the like. Also applicable are aromatic solvents such as benzene, toluene, mesitylene, and the like. Typical ether solvents are ethyl octyl ether, ethyl hexyl ether, diethylene glycol methyl ether, diethylene glycol diethyl ether, diethylene glycol dibutyl ether, ethylene glycol dimethyl ether, ethylene glycol diethyl ether, trioxane, tetrahydrofuran, ethylene glycol dibutyl ether and the like. Ester solvents which may be employed include pentyl butanoate, ethyl decanoate, ethyl hexanoate, and the like. Silicone oils such as the dimethyl polysiloxanes, bis(chlorophenyl) polysiloxanes, hexapropyldisilane, and diethyldipropyldiphenyldisilane may also be employed. Other ester solvents are those derived from succinic, glutaric, adipic, pimelic, suberic, azelaic, sebacic and pinic acids. Specific examples of such esters are di-(2-ethylhexyl) adipate, di-(2-ethylhexyl) azelate, di-(2-ethylhexyl) sebacate, di-(methylcyclohexyl) adipate and the like. Preferred solvents are the polar ethers such as diethylene glycol dimethyl ether and tetrahydrofuran.

A further criteria for the solvent is that it be one which is easily separable from the compounds formed in the process. If, for example, the product is a liquid, the solvent should be selected so that it has a normal boiling point differing by at least 20° C. from the normal boiling point of the liquid product. Use of such a solvent enables separation of the product by means of distillation. If the product is a solid, the solvent should be selected so that its freezing point is sufficiently low to enable separation of the product therefrom by means of crystallization.

The time required for my process will vary in accordance with the other reaction variables. It can generally vary from about 30 seconds to about four days, however.

Although not critical, it is generally desirable to agitate the reaction mixture when carrying out my process. Agitation, especially if the reactants are not mutually soluble in the reaction solvent, insures a homogeneous reaction mass and an even reaction rate. Obviously, both conditions are desirable since they increase the efficiency of the process.

In order to insure high yields of product, based on the more expensive bis-(cyclomatic) nickel reactant, it is generally preferable in my process to use excess quantities of the acetylenic reactant. In general, I employ from about one to about 10 moles of the acetylenic reactant for each mole of the bis(cyclomatic) nickel reactant. Higher or lower quantities of the acetylenic reactant may be used but, in general, I find that quantities within this range insure a relatively high yield of product. In instances where the acetylenic reactant is more expensive than the nickel reactant, I employ a molar excess of the latter.

As previously set forth, my invention embraces a variety of bis(cyclomatic) nickel-acetylenic compounds. In order to simplify the nomenclature, the compounds are named throughout this specification as bis(cyclomatic) nickel-acetylenic adducts. Typical of these compounds of my invention are dicyclopentadienyl nickel-dimethyl butyndioate, dicyclopentadienyl nickel-diethyl butyndioate, dicyclopentadienyl nickel-diisopropyl-butyndioate, dicyclopentadienyl nickel-1,1,1,4,4,4-hexafluorobutyne-2, dicyclopentadienyl nickel-methyl propiolate, dicyclopentadienyl nickel-ethyl propiolate, dicyclopentadienyl nickel-ethyl phenylpropiolate, dicyclopentadienyl nickel - dicyanoacetylene, dicyclopentadienyl nickel-dimethyl-4,4'-ethynylene-dibenzoate, dicyclopentadienyl nickel-dimethyl-2,6-octadien-4-ynedioate, dicyclopentadienyl nickel-1,6-diethoxy-1,5-hexadien-3-yne, dicyclopentadienyl nickel-1,4-dimethoxy-2-butyne, dicyclopentadienyl nickel - 2,6-octadien-4-ynedinitrile, dicyclopentadienyl nickel-1,1,1,4,4,4-hexachloro-2-butyne, dicyclopentadienyl nickel-1,1,1,8,8,8-hexafluoro-2,6-octadien - 4 - yne, dicyclopentadienyl nickel-4-4' - ethynylenedibenzonitrile, dicyclopentadienyl nickel - bis(m-methoxyphenyl)acetylene, dicyclopentadienyl nickel-bis($\alpha,\alpha,\alpha$,-trifluoro-p-tolyl) acetylene, dicyclopentadienyl nickel-diisopropyl-4,4'-ethynylenedibenzoate, dicyclopentadienyl nickel-m,m' - ethynylenedibenzonitrile, and dicyclopentadienyl nickel-acetylenedicarboxamide.

Preferably, the process is carried out under a protective atmosphere of an inert gas such as nitrogen, helium, argon and the like. This prevents decomposition of the reactants and/or products and results in the obtaining of higher yields.

To further illustrate my compounds and their mode of preparation, there are presented the following examples in which all parts and percentages are by weight unless otherwise indicated.

*Example I*

A solution comprising two parts of dicyclopentadienyl nickel, 1.5 parts of dimethylbutyndioate in about 17.8 parts of tetrahydrofuran was allowed to stand at room temperature for 65 hours under nitrogen. The solvent was removed by heating the reaction mixture at room temperature, and the residue was then heated at 40° C. and 0.02 mm. Hg to remove the unreacted dicyclopentadienyl nickel by sublimation. The remaining residue was triturated with low-boiling petroleum ether, and the solution was filtered. Fractional crystallization from the filtrate yielded 1.7 parts of an orange solid. A portion of this product was further purified by means of sublimation at 60° C. and 0.02 mm. Hg followed by recrystallization from low-boiling petroleum ether to yield a bright orange crystalline solid having a melting point of 84° C. On analysis, the product was found to be dicyclopentadienyl nickel-dimethyl butyndioate. Calculated for $C_{16}H_{16}O_4Ni$ C, 58.1; H, 4.87; Ni, 17.7 Found: C, 57.9; H, 4.88; Ni, 17.4 percent. The theoretical molecular weight was 331, and that found by the Signer method was 326. The yield of product was 68 percent of the theoretical based on the quantity of dicyclopentadienyl nickel consumed in the reaction.

*Example II*

One gram of dicyclopentadienyl nickel-dimethyl butyndiate ($3.0 \times 10^{-3}$ mole) was dissolved in 30 ml. of diethyl ether cooled to 0° C. and reduced with hydrogen over 50 mg. of reduced platinum oxide. A volume uptake of 91 cc. of hydrogen was observed at an ambient temperature of 25° C. and a pressure of 749 mm. Hg. Assuming a partial pressure for diethyl ether of 180 mm. at 0° C., the molar uptake of hydrogen was $2.8 \times 10^{-3}$ moles. The hydrogenation stopped at this stage leaving a dark red reaction mixture which was then filtered. Diethyl ether was removed from the filtrate by heating in vacuo, and the red oily residue was dissolved in low-boiling petroleum ether and recrystallized to yield 0.550 gram of the dihydro derivative of dicyclopentadienyl nickel-dimethyl butyndioate. The compound was recovered as red needle-like crystals having a melting point of 58° C. and on analysis, there was found: C, 57.5; H, 5.51 percent with a molecular weight of 332. The values calculated for $C_{16}H_{18}O_4Ni$ were: C, 57.7; H, 5.44 percent with a molecular weight of 333.

*Example III*

Two parts of dicyclopentadienyl nickel and three parts of perfluorobutyne-2 were placed in a sealed reactor along with 13 parts of toluene. The reaction mixture was left to stand at room temperature for approximately 450 hours. It was then discharged under nitrogen, and the black immobile reaction mixture was dispersed with low-boiling petroleum ether, filtered, and the sol-like residue was thoroughly washed with petroleum ether. The filtrate was chromatographed on alumina and eluted with a benzene-petroleum ether mixture containing 20 volume percent benzene and 80 volume percent petroleum ether. The initial product fraction consisted of a yellow oil which tended to crystallize. This fraction was followed by a blue-green cut which also crystallized on removal of solvent. Purification of the yellow and blue-green products was achieved by repeated chromatography on alumina followed by elution with low-boiling petroleum ether, crystallization from the petroleum ether at −25° C., and the sublimation at 0.05 mm. Hg and 35° C. The yellow crystalline product was found to be dicyclopentadienyl nickel-1,1,1,4,4,4-hexafluorobutyne-2. There were obtained 0.75 part of this product having a melting point of 71–72° C. Calculated for $C_{14}H_{10}F_6Ni$: C, 47.9; H, 2.87; Ni, 16.7. Found: C, 47.4; H, 2.95; Ni, 16.5 percent.

The blue-green crystalline product having a needle-like crystalline form was found to be bis(cyclopentadienyl nickel) perfluorobutyne-2. There was obtained 0.8 part of the product having a melting point of 94–95° C. Calculated for $C_{14}H_{10}F_6Ni_2$: C, 41.0; H, 2.46; Ni, 28.7. Found: C, 41.0; H, 2.42; Ni, 28.5 percent.

*Example IV*

A solution comprising six parts of dicyclopentadienyl nickel and six parts of methyl propiolate in about 62 parts of tetrahydrofuran was heated at reflux for 24 hours under a protective atmosphere of nitrogen. The solvent was removed from the reaction mixture by heating under reduced pressure, and the reaction residue was then triturated with low-boiling petroleum ether. The triturates were decanted from the insoluble residues and chromatographed on alumnia. On elution with petroleum ether, there was obtained 0.5 part of unreacted dicyclopentadienyl nickel. Further elution of the alumina with a solution comprising 30 volume percent benzene and 70 volume percent petroleum ether yielded yellow crystalline plates in the initial chromatographic cut followed by dark green needles in the subsequent cuts. Repeated crystallization of the orange plates from petroleum ether followed by recrystallization from methanol resulted in the isolation of 0.05 part of dicyclopentadienyl nickel-methyl propiolate having a melting point of 116–117° C. Calculated for $C_{14}H_{14}O_2Ni$: C, 61.6; H, 5.16, with a molecular weight of 273. Found: C, 59.8; H, 4.58 percent with a molecular weight of 267 by the Signer method.

The insoluble residues remaining from the petroleum ether triturates were dispersed in a mixture comprising 30 volume percent benzene and 70 volume percent ether, chromatographed on alumina, and eluted with the same solvent mixture. The major portion of the dark green product previously mentioned was isolated in this step. Recrystallization of the green material from petroleum ether followed by recrystallization from methanol resulted in the isolation of 1.5 parts of bis(cyclopentadienyl nickel) methyl propiolate having a melting point of 102–103° C. Calculated for $C_{14}H_{14}O_2Ni_2$: C, 50.7; H, 4.26; Ni, 35.4. Found: C, 49.9; H, 3.96; Ni, 35.2 percent.

*Example V*

A solution comprising 3.0 parts of dicyclopentadienyl nickel and four parts of ethyl propiolate in about 35.5 parts of tetrahydrofuran was sealed in a reaction vessel under a nitrogen atmosphere and allowed to stand at room temperature for 25 days. The reaction vessel was then discharged, solvent was removed by heating at room temperature and reduced pressure, and the reaction residue was dissolved in petroleum ether and chromatographed through an alumina column. Elution with low-boiling petroleum ether resulted in the recovery of 2.4 parts of unreacted dicyclopentadienyl nickel. Further elution with a mixture comprising 30 volume percent benzene and 70 volume percent petroleum ether resulted in the recovery of an orange oil, dicyclopentadienyl nickel-ethyl propiolate, and a dark green solid, bis(cyclopentadienyl nickel) ethyl propiolate. Recrystallization of the bis(cyclopentadienyl nickel) ethyl propiolate from petroleum ether at −25° C. yielded 0.4 part of dark green needles having a melting point of 95° C. On analysis, there was found: C, 52.3; H, 4.63; Ni, 33.9, with a molecular weight of 345 (Signer method). Calculated for $C_{15}H_{16}O_2Ni_2$: C, 52.1; H, 4.63; Ni, 34.0 percent with a molecular weight of 346.

*Example VI*

A solution comprising two parts of diethyl acetylene dicarboxylate and 3.0 parts of dicyclopentadienyl nickel in about 35.5 parts of tetrahydrofuran was placed in a sealed reaction vessel under nitrogen and allowed to stand at room temperature for 45 hours. The solvent was removed from the reaction mixture by heating at room temperature under reduced pressure, and the oily brown reaction residue was dissolved in low-boiling petroleum ether and chromatographed on alumina. Unreacted dicyclopentadienyl nickel passed through the alumina column readily, and sublimation of the eluant residue yielded 1.0 part of this reactant. The column was then eluted with pure benzene, and there was obtained an orange reaction product. Removal of benzene at room temperature and reduced pressure left an amber-colored oily residue which was further purified by fractional crystallization from ethanol followed by fractional crystallization from low-boiling petroleum ether at temperatures between −30 and −40° C. The product, dicyclopentadienyl nickel-diethyl butyndioate was isolated as orange-red needles having a melting point of 42–43° C. Two and eight tenths parts of this product were obtained. On analysis, there was found: C, 60.5; H, 5.73; Ni, 16.5, with a molecular weight of 345 (Signer method). Calculated for $C_{18}H_{20}O_4Ni$: C, 60.2; H, 5.65; Ni, 16.4 percent with a molecular weight of 359.

*Example VII*

A solution comprising five parts of dicyclopentadienyl nickel and 5.95 parts of diisopropylacetylene dicarboxylate in about 53.4 parts of tetrahydrofuran was allowed to stand at room temperature for 116 hours under nitrogen. At the end of this time, the solvent was stripped from the reaction mixture under reduced pressure, and the residue was heated at 45° C. under full pump vacuum to remove any unreacted dicyclopentadienyl nickel. Only a trace amount of dicyclopentadienyl nickel was recovered. The residue was then chromatographed on alumina, and two main bands were observed. The principal band was washed from the column with a solvent mixture comprising 25 percent by volume of benzene and 75 percent by volume of low-boiling petroleum ether. The other band was removed by eluting with benzene. Recrystallization of the main fraction from petroleum ether at a temperature of −35° C. yielded 5.7 parts of reddish-orange crystals which were dicyclopentadienyl nickel-diisopropyl butyndioate. The compound had a melting point of 68–71° C. and exhibited peaks at 5.85 and 5.90 microns in the infrared region. An analytical sample having a melting point of 72–73° C. was prepared by further recrystallization from petroleum ether. On analysis, there was found: C, 62.1; H, 6.27; Ni, 15.4. Calculated for $C_{20}H_{24}O_4Ni$: C, 62.04; H, 6.25; Ni, 15.2 percent.

The other fraction, which was a dark green oil, was recrystallized from petroleum ether at −40° C. to yield 0.120 part of dark green needles having a melting point of 68–69° C. The compound which was bis(cyclopentadienylnickel)-diisopropyl acetylenedicarboxylate had a peak at 5.88 microns and a doublet at 9.90 and 10.02 microns in the infrared region. On analysis, there was found: C, 54.0; H, 5.45. Calculated for $C_{20}H_{24}O_4Ni_2$: C, 53.9; H, 5.43 percent.

*Example VIII*

A solution comprising one mole of dicyano acetylene and one mole of methylcyclopentadienyl cyclopentadienyl nickel in tetrahydrofuran solvent is agitated under nitrogen for five minutes at a temperature of −30° C. The pressure in the system is atmospheric. The reaction mixture is then discharged and heated under vacuum to remove solvent. The residue is dissolved in low-boiling petroleum ether and chromatographed through an alumina column. The eluate is slowly cooled to crystallize the compound which is the 1:1 adduct of methylcyclopentadienyl cyclopentadienyl nickel and dicyano acetylene.

*Example IX*

A solution comprising 0.7 mole of dimethyl 4,4'-acetylene-dibenzoate and one mole of bis(methylcyclopentadienyl) nickel in benzene is agitated under a nitrogen atmosphere and atmospheric pressure for three days at a temperature of 30° C. The reaction mixture is then discharged and heated under vacuum to remove solvent. The residue is dissolved in low-boiling petroleum ether which is cooled to separate the product by means of crystallization. The crystalline product is then dissolved in methanol and purified further by crystallization from the methanol. In this manner, there is obtained the compound which is a 1:1 adduct of bis(methylcyclopentadienyl) nickel and dimethyl 4,4'-acetylenedibenzoate.

*Example X*

A solution comprising 0.8 mole of dimethyl octa-2,6-dien-4-ynoate and 1.3 moles of dicyclopentadienyl nickel in diethyl ether solvent is agitated under a nitrogen atmosphere at atmospheric pressure for four days at a temperature of 40° C. The reaction product is then discharged; solvent is removed by heating under vacuum, and the residue is recrystallized from methanol to yield the product, dicyclopentadienyl nickel-dimethyl-2,6-octadien-4-ynedioate.

*Example XI*

A solution comprising 0.5 mole of 1,6-diethoxy-hexa-1,5-dien-3-yne and 0.7 mole of dicyclopentadienyl nickel in toluene solvent is agitated for six days under a nitrogen atmosphere and atmospheric pressure at a temperature of 50° C. The reaction product is discharged and heated in vacuo to distill off the solvent. The residue is then dissolved in a solvent mixture comprising one part of methanol and three parts of low-boiling petroleum ether. The solution is slowly cooled to yield the crystalline product dicyclopentadienyl nickel-1,6-diethoxy-1,5-hexadien-3-yne.

*Example XII*

A solution comprising acetone solvent having dissolved therein 0.2 mole of 1,6-dicyano-hexa-1,5-dien-3-yne and 0.3 mole of dicyclopentadienyl nickel is charged to a reaction vessel. It is then agitated under a nitrogen atmosphere at atmospheric pressure for three hours at a temperature of −10° C. The product is then discharged; solvent is removed by heating in vacuo, and the residue is recrystallized from petroleum ether to give a good yield of dicyclopentadienyl nickel-2,6-octadien-4-ynedinitrile.

*Example XIII*

A solution comprising 0.3 mole of 1,1,1,4,4,4-hexachlorobutyne-2 and 0.2 mole of dicyclopentadienyl nickel in tetrahydrofuran solvent is maintained at 35° C. for 10 hours at atmospheric pressure under nitrogen. During this period, the reaction mixture is agitated. The reaction product is then discharged, and solvent is removed therefrom by heating under vacuum. The residue is dissolved in low-boiling petroleum ether and chromatographed on alumina. The eluate is slowly cooled to precipitate the crystalline product, dicyclopentadienyl-nickel-1,1,1,4,4,4-hexachlorobutyne-2.

*Example XIV*

Five tenths moles of 1,1,1,8,8,8-hexafluoro-octa-2,6-dien-4-yne and 0.5 mole of diindenyl nickel are dissolved in ethyl acetate solvent. The resulting mixture is agitated for two days at 60° C. under a nitrogen atmosphere at atmospheric pressure. The reaction product is then discharged and heated under vacuum to remove solvent. The residue is dissolved in low-boiling petroleum ether and chromatographed on alumina. The eluate is slowly cooled to yield the product which is the 1:1 adduct of diindenyl nickel and 1,1,1,8,8,8-hexafluoro-octa-2,6-dien-4-yne.

Example XV

A solution comprising 10 moles of bis(m-methoxyphenyl) acetylene and 1.0 mole of dicyclopentadienyl nickel in diethylene glycol dimethyl ether solvent is heated at 100° C. for four hours with agitation under a nitrogen atmosphere at atmospheric pressure. The reaction mixture is then discharged. Solvent is removed therefrom by heating under vacuum, and the residue is dissolved in diethyl ether. By means of fractional crystallization, there is separated from the diethyl ether in good yield the product, dicyclopentadienyl nickel-bis(m-methoxyphenyl)acetylene.

Example XVI

A solution comprising 0.5 mole of bis($\alpha,\alpha,\alpha$-trifluoro-p-tolyl) acetylene and 0.7 mole of dicyclopentadienyl nickel in dimethyl formamide solvent is heated at 110° C. for three hours with agitation under a nitrogen atmosphere. The reaction product is then discharged; solvent is removed by heating in vacuo, and the resulting residue is dissolved in low-boiling petroleum ether. This solution is then chromatographed through an alumina-packed column. There is separated from the eluate in good yield the product, dicyclopentadienyl nickel bis($\alpha,\alpha,\alpha$-trifluoro-p-tolyl) acetylene by means of fractional crystallization.

Example XVII

A solution is formed by dissolving 7.5 molecules of acetylene dicarboxamide and 1.5 moles of dicyclopentadienyl nickel in dimethyl formamide solvent. This solution is heated for 20 hours at a temperature of 70° C. under a nitrogen atmosphere with agitation. The reaction mixture is then discharged; solvent is removed by heating in vacuo, and the residue is dissolved in methanol. On cooling, there is crystallized from the methanol in good yield the product, dicyclopentadienyl nickel-acetylenedicarboxamide.

Hydrogenation of my dicyclopentadienyl nickel-acetylenic compounds of Examples III–XVII using the method of Example II gives in each case, the respective dihydro derivative. During the reaction one equivalent of hydrogen is taken up and the dihydro derivative is formed in good yield.

A further embodiment of the present invention comprises the use of the compounds of my invention as antiknock agents in a liquid hydrocarbon fuel used in spark ignition internal combustion engines. For this use, I provide a liquid hydrocarbon fuel of the gasoline boiling range containing from about 0.05 to about 10 grams per gallon of nickel as a compound of my invention. It is found that these compositions, when employed as fuels for a spark ignition internal combustion engine, greatly reduce the tendency of the engine to knock.

A preferred composition of my invention comprises a hydrocarbon of the gasoline boiling range containing from about 1.0 to about 6.0 grams of metal per gallon of fuel as a nickel compound as defined previously. The range of metal concentration is preferred since it is found that superior fuels result from its employment.

The base fuels used to prepare the compositions of my invention have a wide variation of compositions. They generally are petroleum hydrocarbons and are usually blends of two or more components containing a mixture of many individual hydrocarbon compounds. These fuels can contain all types of hydrocarbons, including paraffins, both straight and branched chain; olefins; cycloaliphatics containing paraffin or olefin side chains; and aromatics containing aliphatic side chains. The fuel type depends on the base stock from which it is obtained and on the method of refining. For example, it can be a straight run or processed hydrocarbon, including thermally cracked, catalytically cracked, reformed fractions, etc. When used for spark-fired engines, the boiling range of the components in gasoline can vary from zero to about 430° F., although the boiling range of the fuel blend is often found to be between an initial boiling point of from about 80° F. to 100° F. and a final boiling point of about 430° F. While the above is true for ordinary gasoline, the boiling range is somewhat more restricted in the case of aviation gasoline. Specifications for the latter often call for a boiling range of from about 82° F. to about 338° F., with certain fractions of the fuel boiling away at particular intermediate temperatures.

These fuels often contain minor quantities of various impurities. One such impurity is sulfur, which can be present either in a combined form as an organic or inorganic compound, or as elemental sulfur. The amounts of such sulfur can vary in various fuels from about 0.003 percent to about 0.30 percent by weight. Fuels containing quantities of sulfur, both lesser and greater than the range of amounts referred to above, are also known. These fuels also often contain added chemicals in the nature of antioxidants, rust inhibitors, dyes, and the like.

The bis(cyclomatic) nickel-acetylenic compounds of my invention or their dihydro derivatives can be added directly to the hydrocarbon fuel, and the mixture then subjected to stirring, mixing or other means of agitation until a homogeneous fluid results. In addition to the bis(cyclomatic) nickel-acetylenic compounds, the fuel may have added thereto antioxidants, metal deactivators, halohydrocarbon scavengers, phosphorus compounds, anti-rust and anti-icing agents, and supplementary wear inhibitors.

As stated previously, my method for forming the bis(cyclomatic) nickel acetylene compounds of this invention results also in the formation of some bis(cyclopentadienyl nickel) acetylenic compounds in which the acetylenic group is bonded to the two nickel atoms each of which are also bonded to each other and in turn to a cyclopentadienyl-type hydrocarbon group. If desired, the two products may be separated by such conventional methods as chromatography, crystallization, solvent extraction, sublimation, and the like. On utilizing the compounds as antiknock additives, however, it is not necessary that they be separated. Since both types of compounds are potent antiknocks, a mixture of the two types can be employed as an antiknock additive.

The following examples are illustrative of improved fuels containing a bis(cyclomatic) nickel-acetylenic compound of my invention or their dihydro derivatives and also mixtures of such compounds with bis(cyclopentadienyl nickel) acetylenic compounds.

Example XVIII

To a synthetic fuel consisting of 20 volume percent toluene, 20 volume percent isobutylene, 20 volume percent isooctane and 40 volume percent n-heptane is added dicyclopentadienyl nickel-diethylbutyndioate in amount such that the nickel concentration is 0.05 gram per gallon. The mixture is agitated until a homogeneous blend of dicyclopentadienyl nickel-diethyl butyndioate in the fuel is achieved. This fuel has substantially increased octane value.

Example XIX

To 1000 gallons of commercial gasoline having a gravity of 59.0° API, an initial boiling point of 98° F. and a final boiling point of 390° F. which contains 45.2 volume percent paraffins, 28.4 volume percent olefins and 25.4 volume percent aromatics is added 8.0 grams per gallon of nickel as dicyclopentadienyl nickel-ethyl propiolate and 2.0 grams of the dihydro derivative of dicyclopentadienyl nickel-ether propiolate to give a fuel of enhanced octane quality.

Example XX

Dicyclopentadienyl nickel-dimethyl butyndioate is added in amount sufficient to give a nickel concentration of 6.0 grams per gallon to a gasoline having an initial boiling point of 93° F., a final boiling point of 378° F. and an API gravity of 56.2°.

*Example XXI*

To a liquid hydrocarbon fuel containing 49.9 volume percent paraffins, 15.9 volume percent olefins and 34.2 volume percent aromatics and which has an API gravity of 51.5°, an initial boiling point of 11° F. and a final boiling point of 394° F. is added a mixture of dicyclopentadienyl nickel-1,6-diethoxy-1,5-hexadien-3-yne and bis(cyclopentadienyl nickel) 1,6-diethoxy-1,5-hexadien-3-yne to give a nickel concentration of about 3.0 grams per gallon.

*Example XXII*

To the base fuel of Example XXI is added a mixture of dicyclopentadienyl nickel - 4,4'-ethynylenedibenzonitrile and bis(cyclopentadienyl nickel) 4,4'-bis(benzonitrile) acetylene to give a nickel concentration of about 2.0 grams per gallon.

A further embodiment of the present invention comprises a liquid hydrocarbon fuel of the gasoline boiling range containing an organolead antiknock agent and in addition a bis(cyclomatic) nickel-acetylenic compound or its dihydro derivative as previously defined or a mixture of such compounds with a bis(cyclomatic nickel) acetylenic compound. In this embodiment of this invention, it is often desirable that the fuel contain also conventional halohydrocarbon scavengers or corrective agents as conventionally used with organolead antikock agents. When an organolead antiknock agent is employed, it may be present in the fuel in concentrations up to about eight grams of lead per gallon. In the case of aviation fuels, up to 6.34 grams of lead may be employed.

For each gram of lead, there may be present from about 0.008 to about 10 grams of nickel as a bis(cyclomatic) nickel acetylenic compound or its dihydro derivative or a mixture of such compounds with a bis(cyclomatic nickel) acetylenic compound. A preferred range comprises those compositions containing from about 0.1 to about six grams of nickel in the form previously described for each gram of lead as an organolead compound.

The organolead antiknock agents are ordinarily hydrocarbolead compounds including tetraphenyllead, dimethyldiphenyllead, tetrapropyllead, dimethyldiethyllead, tetramethyllead and the like. Tetraethyllead is preferred as it is most commonly available as a commercial antiknock agent. It is also convenient in the case where organolead antiknock agents are employed to premix into a fluid the bis(cyclomatic) nickel acetylene compound or its dihydro derivative or a mixture of such compounds with a bis(cyclomatic nickel) acetylenic compound, the organolead antiknock agent and supplementary agents, such as scavengers, antioxidants, dyes and solvents, which fluids are later added to the liquid hydrocarbon fuel to be improved.

Where halohydrocarbon compounds are employed as scavenging agents, the amounts of halogen used are given in terms of theories of halogen. A theory of halogen is defined as the amount of halogen which is necessary to react completely with the metal present in the antiknock mixture to convert it to the metal dihalide as for example, lead dihalide. In other words, a theory of halogen represents two atoms of halogen for every atom of lead present. In like manner, a theory of phosphorus is the amount of phosphorus required to convert the lead present to lead orthophosphate, $Pb_3(PO_4)_2$, that is, a theory of phosphorus represents two atoms of phosphorus for every three atoms of lead. One theory of arsenic, antimony and bis-muth is defined in the same general way. That is, one theory thereof is two atoms of the element per each three atoms of lead.

The halohydrocarbon scavengers which can be employed in the compositions of this invention can be either aliphatic or aromatic halohydrocarbons or a combination of the two having halogen attached to carbon in either the aliphatic or aromatic portion of the molecule. The scavengers may also be carbon, hydrogen and oxygen containing compounds, such as haloalkyl ethers, halohydrins, halo ethers, halonitro compounds, and the like. Still other examples of scavengers that may be used in the fuels of this invention are illustrated in U.S. Patents 1,592,954; 1,668,022; 2,398,281; 2,479,900; 2,479,901; 2,479,902; 2,479,903; 2,496,983; 2,661,379; 2,822,252; 2,849,302; 2,849,303; and 2,849,304. Mixtures of different scavengers may also be used and other scavengers and modifying agents, such as phosphorus compounds, may also be included. Concentrations of organic halide scavengers ranging from about 0.5 to about 2.5 theories based on the lead are usually sufficient, although greater or lesser amounts may be used. See, for example, the description of scavenger concentrations and proportions given in U.S. Patent 2,398,381. Such concentrations and proportions can be successfully used in the practice of this invention.

When used in the compositions of this invention, phosphorus, arsenic, antimony and bismuth compounds have the property of altering engine deposit characteristics in several helpful ways. Thus, benefits are achieved by including in the compositions of this invention one or more gasoline-soluble organic compounds of the elements of Group VA of the Periodic Table, which elements have atomic numbers 15 through 83. The Periodic Table to which reference is made is found in Lange's Handbook of Chemistry, 7th edition, pages 58–59. One effect of these Group VA compounds is to alter the deposits so that in the case of spark plugs the resulting deposits are less conductive. Thus, imparted to the spark plug is greater resistance to fouling. In the case of combustion chamber surface deposits, the Group VA element renders these deposits less catalytic with respect to hydrocarbon oxidation and thus reduces surface ignition. In addition, these Group VA elements in some way inhibit deposit build up on combustion chamber surfaces, notably exhaust valves. This beneficial effect insures excellent engine durability. In particular, excellent exhaust valve life is assured. Of these Group VA elements the use of gasoline-soluble phosphorus compounds is preferred from the cost-effectiveness standpoint. Applicable phosphorus additives include the general organic phosphorus compounds, such as derivatives of phosphoric and phosphorus acids. Representative examples of these compounds include trimethylphosphate, trimethylphosphite, phenyldimethylphosphate, triphenylphosphate, tricresylphosphate, tri-β-chloropropyl thionophosphate, tributoxyethylphosphate, xylyl dimethylphosphate, and other alkyl, aryl, aralkyl, alkaryl and cycloalkyl analogues and homologues of these compounds. Phenyldimethylphosphates in which the phenyl group is substituted with up to three methyl radicals are particularly preferred because they exhibit essentially no antagonistic effects upon octane quality during engine combustion. Other suitable phosphorus compounds are exemplified by dixylyl phosphoramidate, tributylphosphine, triphenylphosphine oxide, tricresyl thiophosphate, cresyldiphenyl phosphate, and the like. Gasoline-soluble compounds of arsenic, antimony and bismuth corresponding to the above phosphorus compounds are likewise useful in this respect. Thus, use can be made of various alkyl, cycloalkyl, aralkyl, aryl and/or alkaryl, arsenates, arsenites, antimonates, antimonites, bismuthates, bismuthites, etc. Tricresyl arsenite, tricumenyl arsenate, trioctyl antimonate, triethyl antimonite, diethylphenyl bismuthate and the like serve as examples. Other very useful arsenic, antimony and bismuth compounds include methyl arsine, trimethyl arsine, triethyl arsine, triphenyl arsine, arseno benzene, triosopropyl bismuthine, tripentyl stibine, tricresyl stibine, trixylyl bismuthine, tricyclohexyl bismuthine and phenyl dicresyl bismuthine.

From the gasoline solubility and engine inductibility standpoints, organic compounds of these Group VA elements having up to about 30 carbon atoms in the molecule are preferable. Concentrations of these Group VA compounds ranging from about 0.05 to about one theory based on the lead normally suffice. In other words, the foregoing technical benefits are achieved when the atom ratio of Group VA element-to-lead ranges from about 0.1:3 to about 2:3.

A further embodiment of my invention comprises antiknock fluids containing an organolead antiknock agent, a bis(cyclomatic) nickel-acetylenic compound or its dihydro derivative or a mixture of a bis(cyclomatic) nickel-acetylenic compound and/or its dihydro derivative and a bis(cyclomatic nickel) acetylenic compound, and optionally, a scavenger for the organolead compound. The quantities of nickel compound and scavenger present with respect to the quantity of lead present are the same as set forth in the preceding paragraphs in describing a hydrocarbon fuel containing these various components. Thus, the fluid can be blended with a hydrocarbon base fuel to give the fuel compositions described above.

The following examples are illustrative of fuels and fluids containing organolead compounds in combination with various bis(cyclomatic) nickel-acetylene compounds, and their dihydro derivatives of this invention, or a mixture of said compounds with a bis(cyclomatic nickel) acetylenic compound.

*Example XXIII*

To 1000 gallons of a gasoline containing 46.2 percent paraffins, 28.4 percent olefins, and 25.4 percent aromatics which has a final boiling point of 390° F. and an API gravity of 59.0° and which contains three milliliters of tetraethyllead as 62-mix (1 theory of ethylene dichloride and 0.5 theory of ethylene dibromide) is added sufficient dicyclopentadienyl nickel-1,1,1,4,4,4-hexafluoro-2-butyne to give a nickel concentration of six grams per gallon.

*Example XXIV*

To a typical aviation fuel having an API gravity of 64.4° and an end boiling point of 335° F. and which contains 8.0 grams of tetraethyllead and one theory of dibromobutane is added a mixture of dicyclopentadienyl nickel-diisopropyl butyndioate and bis(cyclopentadienyl nickel) diisopropyl butyndioate in amount such that about two grams of nickel from the compounds are present in the finished fuel.

*Example XXV*

A fluid for addition to gasoline is prepared by admixing tetraethyllead, the dihydro derivative of dicyclopentadienyl nickel-dimethyl butyndioate, and trimethyl phosphate in amount such that for each gram of lead there is 0.01 gram of nickel and 0.1 theory of trimethylphosphate.

To demonstrate the effectiveness of hydrocarbon fuels blended with bis(cyclomatic) nickel-acetylene compounds, and/or their dihydro derivatives, or a mixture of a bis(cyclomatic) nickel-acetylene compound and/or their dihydro derivatives, and a bis(cyclomatic nickel) acetylene compound, according to the invention, tests were made on fuels to which no antiknock agent was added and fuels which were blended in accordance with this invention. These tests were conducted according to the Research Method. The Research Method of determining octane number of a fuel is generally accepted as a method of test which gives a good indication of fuel behavior in full scale automotive engines under normal driving conditions and is the method most used by commercial installations in determining the value of a gasoline additive. The Research Method of testing antiknocks is conducted in a single cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in Test Procedure D–908–55 contained in the 1956 edition of "ASTM Manual of Engine Test Methods for Rating Fuels." When tested in this manner, it is found that the addition of one gram of nickel per gallon as the compound dicyclopentadienyl nickel-dimethyl butyndioate causes a substantial increase in the octane number of a non-additive containing gasoline.

In a further test, according to the Research Method, it was found that the addition of 0.05 gram of nickel per gallon as the compound dicyclopentadienyl nickel-diisopropyl butyndioate to a base fuel containing three milliliters of tetraethyllead per gallon as 62-mix raised the octane number from 98.4 to 99.3. The base fuel was a synthetic blend composed of 40 percent by colume of toluene, 30 percent by volume of n-heptane, 20 percent by volume of diisobutylene and 10 percent by volume of isooctane. 62-mix is a commercial antiknock fluid comprising tetraethyllead, 1.0 theory of ethylene dichloride and 0.5 theory of ethylene dibromide.

Further tests were conducted in a slightly modified version of the single cylinder CFR engine described above. In the modified test version, the fuel is injected directly into the engine cylinder rather than being inducted via a carburetor. In addition, the fuel is continually recirculated prior to injection into the cylinder so as to minimize any precipitation of the additive from the fuel. In this modified test, the single cylinder CFR engine is operated under the following conditions:

Speed, 900 r.p.m.
Spark plug gap, .025″
Ignition timing, 20° BTDC
Ignition breaker point gap, .015″
Jacket cooling temp., 148° F.
Crankcase oil temp., 125° F.
Inlet air temp., 110° F.
Inlet valve lash, .005″
Exhaust valve lash, .010″
Injection nozzle pop-off pressure, 1100 p.s.i.
Injection timing, 140° ATDC The base fuel as in a previous test comprised 40 percent by volume of toluene, 30 percent by volume of n-heptane, 20 percent by volume of diisobutylene and 10 percent by volume of isooctant. The fuel contained in addition three ml. of tetraethyllead per gallon as 62-mix.

To the base fuel was added a typical compound of my invention dicyclopentadienyl nickel-dimethyl butyndioate. The reference fuel containing three ml. per gallon of tetraethyllead as 62-mix had a research octane number of 97.1. When 0.05 gram of nickel per gallon as the compound dicyclopentadienyl nickel-dimethyl butyndioate was added to the base fuel, its research octane number was increased to 100.0. Similar results are obtained using concentrations of the nickel additives up to 10 grams of nickel for each gram of lead in the fuel. Also, good results are obtained using other of the nickel compounds of my invention or their dihydro derivatives, or mixtures of said compounds with a bis(cyclomatic nickel) acetylene compound as the antiknock additive.

A further use for my compounds is in gas phase metal plating. In this application, the compounds are thermally decomposed in an atmosphere of a reducing gas such as hydrogen or a neutral atmosphere such as nitrogen to form metallic films on a substrate material. These films have a wide variety of applications. They may be used in forming conductive surfaces such as employed in a printed circuit, in producing a decorative effect on a substrate material, or in applying a corrosion-resistant coating to a substrate material.

The compounds of my invention also find application as additives to distillate fuels used in home heating, and as additives to lubricating oils and greases to impart improved lubricity characteristics thereto. Further, my compounds may be incorporated in paints, varnish, printing inks, synthetic resins of the drying oil type, oil enamels and the like to impart improved drying characteristics to such compositions. Other important uses of my compounds include their use as chemical intermediates in the preparation of metal-containing polymeric materials. Also, some of the metallic derivatives of my invention can be employed in the manufacture of medicinals and other therapeutic materials, as well as in agricultural chemicals such as, for example, fungicides, defoliants, growth regulants, and the like. In addition to the use of my compounds in reducing smoke and soot when used as additives in distillate fuels used in home heating, they are also useful as additives to jet fuels and diesel fuels in reducing smoke and soot.

A still further utility for my compounds is as additives to solid propellants to control the burning rate of the propellant material.

Having fully defined the novel compounds of my invention, their mode of preparation and their manifold utilities, I desire to be limited only within the lawful scope of the appended claims.

I claim:

1. A fuel composition comprising gasoline containing from about 0.05 to about 10 grams per gallon of nickel as a compound $$QC \equiv CQ' \cdot CyNiCy'$$

wherein Cy and Cy' are cyclomatic hydrocarbon groups having from 5 to 13 carbon atoms, said groups being selected from the class consisting of cyclopentadienyl and indenyl radicals, Q and Q' are selected from the group consisting of electron withdrawing groups, hydrogen and univalent hydrocarbon groups containing up to about 13 carbon atoms, at lease one of Q and Q' being an electron withdrawing group.

2. A fuel composition comprising gasoline containing up to about 6.34 grams of lead per gallon and from about 0.008 to about 10 grams of nickel for each gram of lead as a compound having the formula $$QC \equiv CQ' \cdot CyNiCy'$$

wherein Cy and Cy' are cyclomatic hydrocarbon groups having from 5 to 13 carbon atoms, said groups being selected from the class consisting of cyclopentadienyl and indenyl radicals and Q and Q' are selected from the group consisting of electron withdrawing groups, hydrogen and univalent hydrocarbon groups containing up to about 13 carbon atoms, at least one of Q and Q' being an electron withdrawing group.

3. A fuel composition comprising gasoline containing from about 0.05 to about 10 grams per gallon of nickel as an organo-metallic nickel compound having the formula:

$$QC \equiv CQ' \cdot CyNiCy'$$

wherein Cy and Cy' are cyclomatic hydrocarbon groups which have 5 to about 13 carbon atoms and which are selected from the class consisting of the cyclopentadienyl radical, the indenyl radical, and hydrocarbon substituted cyclopentadienyl and indenyl radicals wherein the hydrocarbon substituents are univalent radicals selected from the class consisting of alkyl, aryl and aralkyl radicals and Q and Q' are selected from the group consisting of electron withdrawing groups, hydrogen, and univalent hydrocarbon groups containing up to about 13 carbon atoms and selected from the class consisting of alkyl, aryl, aralkyl, alkaryl, alkenyl, cycloalkyl, and cycloalkenyl groups, at least one of Q and Q' being an electron withdrawing group.

4. A fuel composition comprising gasoline containing from 0.05 to about 10 grams per gallon of nickel as an organometallic nickel compound having the formula:

$$QC \equiv CQ' \cdot CyNiCy'$$

wherein Cy and Cy' are cyclomatic hydrocarbon groups which have 5 to about 13 carbon atoms and which are selected from the class consisting of the cyclopentadienyl radical, the indenyl radical and hydrocarbon substituted cyclopentadienyl and indenyl radicals wherein the hydrocarbon substituents are univalent radicals selected from the class consisting of alkyl, aryl, and aralkyl radicals, and Q and Q' are selected from the group consisting of hydrogen and univalent hydrocarbon groups containing up to about 13 carbon atoms and selected from the class consisting of alkyl, aryl, alkaryl, aralkyl, alkenyl, cycloalkyl and cycloalkenyl radicals and electron withdrawing groups selected from the class consisting of:

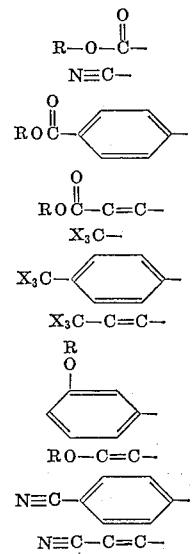

wherein R is a monovalent hydrocarbon group which has up to 10 carbon atoms and which is selected from the class consisting of alkyl, aryl, aralkyl, alkaryl, alkenyl, cycloalkyl, and cycloalkenyl radicals, wherein X is a halogen, at least one of Q and Q' being an electron withdrawing group.

5. A fuel composition of claim 3 comprising gasoline containing from about 0.5 to about 10 grams per gallon of nickel as a dihydro derivative of said organometallic nickel compound.

6. A fuel composition of claim 4 comprising gasoline containing from about 0.05 to about 10 grams per gallon of nickel as a dihydro derivative of said organometallic nickel compound.

7. A fuel composition comprising gasoline containing from about 0.05 to about 10 grams per gallon of nickel as the compound dicyclopentadienyl nickel-diethyl butyndioate.

8. A fuel composition comprising gasoline containing from about 0.05 to about 10 grams per gallon of nickel as the dihydro derivative of dicyclopentadienyl nickel-ethyl propiolate.

9. A fuel composition comprising gasoline containing from about 0.05 to about 10 grams per gallon of nickel as the compound dicyclopentadienyl nickel-dimethyl butyndioate.

10. A fuel composition comprising gasoline containing up to about 6.34 grams of lead per gallon as a lead antiknock agent and from about 0.008 to about 10 grams of nickel for each gram of lead as an organometallic nickel compound having the formula:

$$QC \equiv CQ' \cdot CyNiCy'$$

wherein Cy and Cy' are cyclomatic hydrocarbon groups which have 5 to about 13 carbon atoms and which are selected from the class consisting of the cyclopentadienyl radical, the indenyl radical, and hydrocarbon substituted cyclopentadienyl and indenyl radicals wherein the hydrocarbon substituents are univalent radicals selected from the class consisting of alkyl, aryl and aralkyl radicals and Q and Q' are selected from the group consisting of electron withdrawing groups, hydrogen, and univalent hydrocarbon groups containing up to about 13 carbon atoms and selected from the class consisting of alkyl, aryl, aralkyl, alkaryl, alkenyl, cycloalkyl, and cycloalkenyl groups, at least one of Q and Q' being an electron with drawing group.

11. A fuel composition comprising gasoline containing up to about 6.34 grams of lead per gallon as a lead antiknock agent and from about 0.008 to about 10 grams of nickel for each gram of lead as an organometallic nickel compound having the formula:

$$QC\equiv CQ' \cdot CyNiCy'$$

wherein Cy and Cy' are cyclomatic hydrocarbon groups which have 5 to about 13 carbon atoms and which are selected from the class consisting of the cyclopentadienyl radical, the indenyl radical and hydrocarbon substituted cyclopentadienyl and indenyl radicals wherein the hydrocarbon substituents are univalent radicals selected from the class consisting of alkyl, aryl, and aralkyl radicals, and Q and Q' are selected from the group consisting of hydrogen and univalent hydrocarbon groups containing up to about 13 carbon atoms and selected from the class consisting of alkyl, aryl, aralkyl, alkaryl, alkenyl, cycloalkyl, and cycloalkenyl radicals and electron withdrawing groups selected from the class consisting of

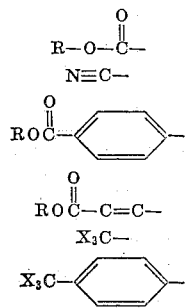

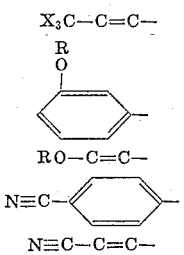

wherein R is a monovalent hydrocarbon group which has up to 10 carbon atoms and which is selected from the class consisting of alkyl, aryl, aralkyl, alkaryl, alkenyl, cycloalkyl, and cycloalkenyl radicals, wherein X is a halogen, at least one of Q and Q' being an electron withdrawing group.

12. A fuel composition of claim 10 comprising gasoline containing from about 0.008 to about 10 grams per gallon of nickel as a dihydro derivative of said organometallic nickel compound.

13. A fuel composition of claim 11 comprising gasoline containing from about 0.008 to about 10 grams per gallon of nickel as a dihydro derivative of said organometallic nickel compound.

14. A fuel composition comprising gasoline containing up to about 6.34 grams of lead per gallon as a lead antiknock and from about 0.008 to about 10 grams of nickel for each gram of lead as the compound dicyclopentadienyl nickel-1,1,1,4,4,4-hexafluoro-2-butyne.

15. A fuel composition comprising gasoline containing up to about 6.34 grams of lead per gallon as a lead antiknock and from about 0.008 to about 10 grams of nickel for each gram of lead as the compound dicyclopentadienyl nickel-dimethylbutyndioate.

References Cited by the Examiner
UNITED STATES PATENTS

| | | | |
|---|---|---|---|
| 3,006,742 | 10/1961 | Brown | 44—68 X |
| 3,032,572 | 5/1962 | Fischer | 44—68 X |
| 3,052,704 | 9/1962 | Benson | 44—68 X |
| 3,060,214 | 10/1962 | Cordes | 44—68 X |
| 3,121,729 | 2/1964 | Fischer | 252—386 X |

DANIEL E. WYMAN, *Primary Examiner.*